(12) United States Patent
Nakayama

(10) Patent No.: US 7,684,976 B2
(45) Date of Patent: Mar. 23, 2010

(54) CONSTRUCTING REGULAR-EXPRESSION DICTIONARY FOR TEXTUAL ANALYSIS

(75) Inventor: Akihiro Nakayama, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 984 days.

(21) Appl. No.: 11/433,192

(22) Filed: May 13, 2006

(65) Prior Publication Data

US 2007/0265833 A1     Nov. 15, 2007

(51) Int. Cl.
G06F 17/21     (2006.01)
(52) U.S. Cl. ................................. 704/10; 704/4; 704/7
(58) Field of Classification Search ............... 704/1, 704/3, 4, 6, 7, 9, 10, 257; 715/234, 513
See application file for complete search history.

(56) References Cited

U.S. PATENT DOCUMENTS 7,370,270 B2 *   5/2008   Feng .......................... 715/234

2004/0128122 A1 *   7/2004   Privault et al. ................. 704/4

OTHER PUBLICATIONS java.util.regex, Java 2 Platform SE v 1.4.2, http://java.sun.com, accessed from Internet on May 1, 2006, copyright 2003.

* cited by examiner

Primary Examiner—Huyen X. Vo
(74) Attorney, Agent, or Firm—Mollborn Patents, Inc.; Fredrik Mollborn

(57) ABSTRACT

A regular-expression dictionary, as opposed to an exact-match dictionary, is constructed for utilization within computerized textual analysis. One or more data types are defined for entries within the regular-expression dictionary, within a markup-language schema. A structure in the markup-language schema is provided that encompasses the data types of the entries within the regular-expression dictionary. For each of a number of entries of the regular-expression dictionary, a mapping methodology is defined between a source definition of the entry to the structure and the data types within the markup-language schema. Furthermore, a definition of the entry is mapped to the data types within the structure of the markup-language schema, using the mapping methodology defined. The markup language may be eXtensible Markup Language (XML), or another type of markup language.

20 Claims, 4 Drawing Sheets

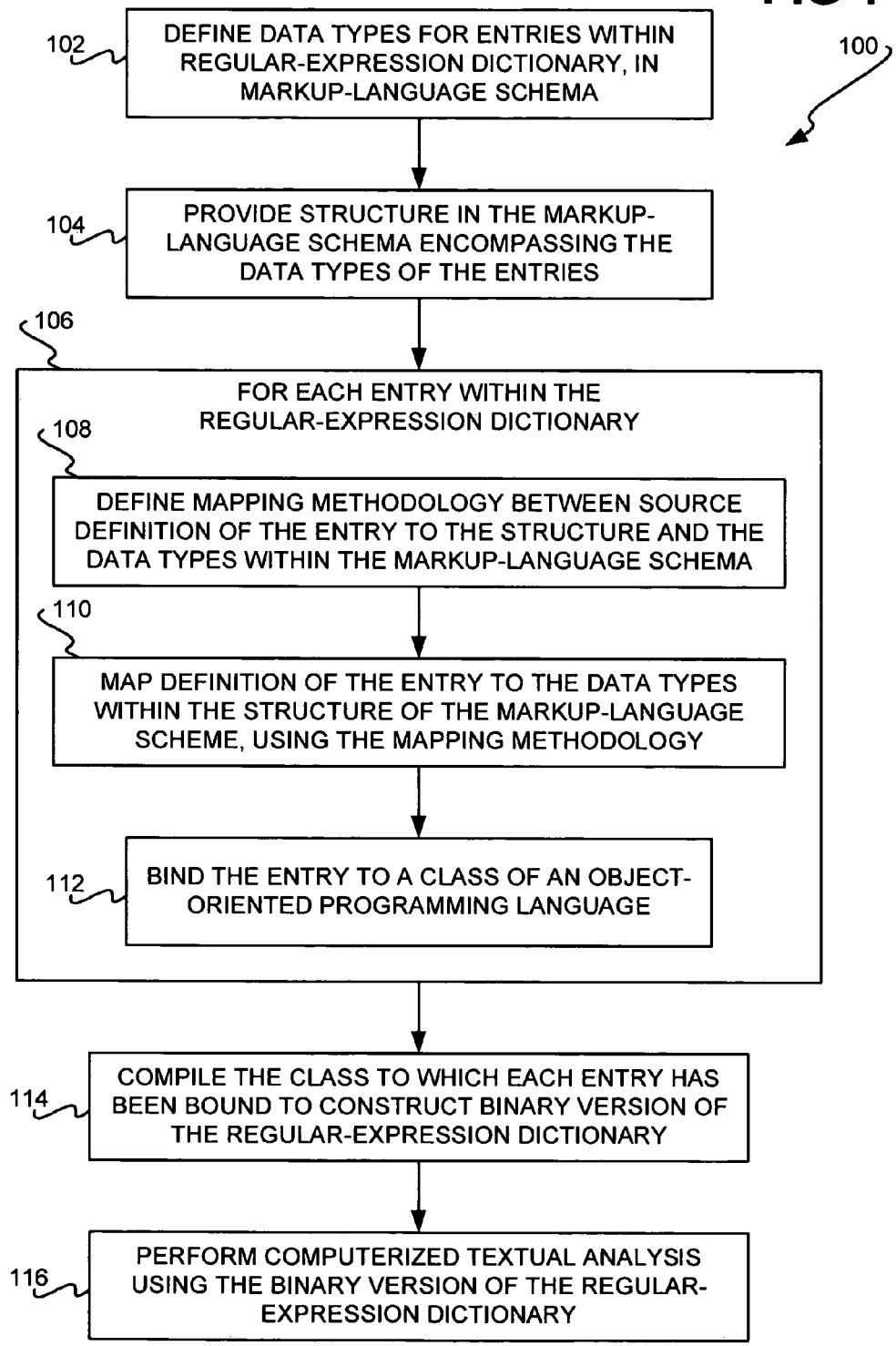

FIG 2D
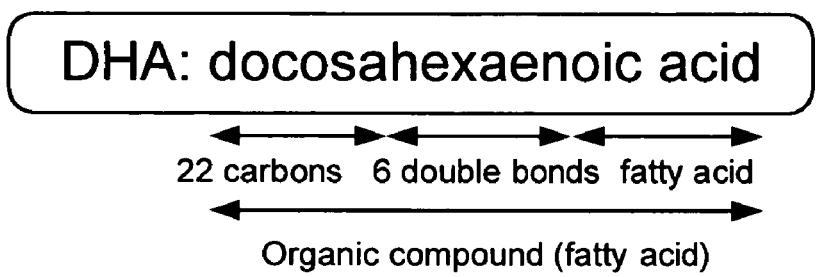
FIG 2E
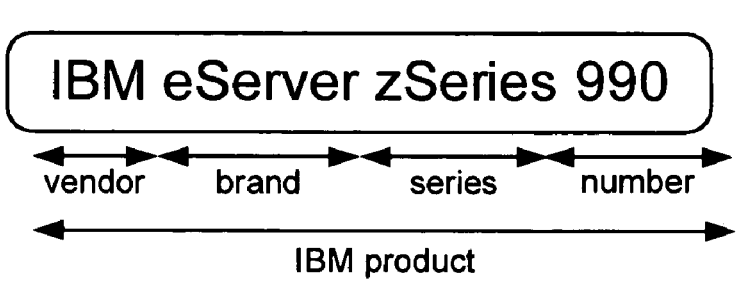
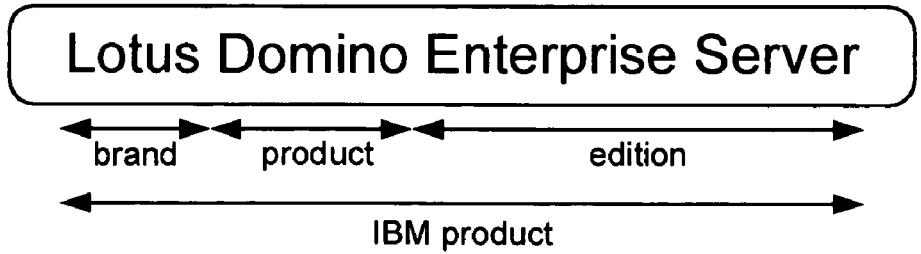

CONSTRUCTING REGULAR-EXPRESSION DICTIONARY FOR TEXTUAL ANALYSIS

FIELD OF THE INVENTION

The present invention relates generally to dictionaries for use in textual analysis, and more particularly to constructing regular-expression dictionaries for use in textual analysis.

BACKGROUND OF THE INVENTION

Computerized textual analysis is commonly performed on computerized data representing text. Such textual analysis includes information retrieval and information extraction, among other types of textual analysis. Within computerized textual analysis, dictionaries are needed to obtain grammar and definitional information regarding words and phrases included in the text.

One type of dictionary is commonly known as an exact-match dictionary. Words and phrases within text are exactly matched, on a character-by-character basis, to entries within the exact-match dictionary. In response, information is provided regarding these words and phrases, such as their grammar and their definitions. Such exact-match dictionaries are commonly implemented in trie structures, which are ordered tree data structures similar to finite-state automaton structures, common hash maps, and so on.

Exact-match dictionaries are commonly employed within computerized textual analysis. Examples include those available within the LanguageWare® software or platform available from International Business Machines, Inc., of Armonk, N.Y. Another example is the dictionary employed within the ChaSen Japanese language morphological textual analysis system, available from the Nara Institute of Science and Technology, located in the Takayama District in the Nara Prefecture of Kansai Science City, and which maintains an Internet web site at http://www.naistjp/index_en.html. Both of these types of exact-match dictionaries can be used within computerized textual analysis.

Another type of dictionary is commonly known as a regular-expression dictionary. Rather than exactly matching words and phrases within text, as in an exact-match dictionary, a regular-expression dictionary employs strings that describe or match a set of strings, according to certain syntax rules. For instance, a date may be referenced in a variety of different formats, such as Jan. 1, 1970, 1 Jan. 1970, Jan. 1, 1970, Jan. 1, 1970, and so on, and therefore resists exact matching as in an exact-match dictionary. Regular-expression dictionaries are thus employed where a regular expression exists, but which can be described in a variety of different notations. Such regular expressions include dates, currency amounts, telephone numbers, Internet universal resource identifiers (URI's) such as universal resource locators (URL's), and chemical symbols.

Regular-expression dictionaries can be implemented by using existing regular-expression libraries. Examples of regular-expression libraries include the Java® programming language regular-expression matching library, available from Sun Microsystems, Inc., of Santa Clara, Calif., and which maintains a web site at http://java.sun.com. Another example is the International Components for Unicode for Java (ICU4J) programming language library, available from International Business Machines, Inc. However, these, and other, regular-expression libraries cannot be employed for or within computerized textual analysis by themselves.

Exact-match dictionaries can be employed for utilization within computerized textual analysis, for a variety of different reasons. They provide a framework that allows for the construction and operation of a programming language library, such as a Java® programming language library. For instance, they provide for the binding to Java® programming language classes, and allow entries to be added to and deleted from the dictionaries via appropriate application-programming interfaces (API's). They further provide for resource management mechanisms, including loading and unloading of the dictionaries.

By comparison, existing regular-expression libraries, such as the libraries noted above, cannot be employed for utilization within computerized textual analysis by themselves, because they lack these capabilities that are found within exact-match dictionaries. As a result, computerized textual analysis suffers, because it cannot retrieve information regarding regular expressions commonly found within text. For this and other reasons, therefore, there is a need for the present invention.

SUMMARY OF THE INVENTION

The present invention relates to a regular-expression dictionary for use within computerized textual analysis. A computer-implemented method of one embodiment of the invention constructs a regular-expression dictionary, as opposed to an exact-match dictionary, for utilization within such textual analysis. One or more data types are defined for entries within the regular-expression dictionary, within a markup-language schema. A structure in the markup-language schema is provided that encompasses the data types of the entries within the regular-expression dictionary. For each of a number of entries of the regular-expression dictionary, a mapping methodology is defined between a source definition of the entry to the structure and the data types within the markup-language schema. Furthermore, a definition of the entry is mapped to the data types within the structure of the markup-language schema, using the mapping methodology defined.

A computerized system of an embodiment of the invention includes a tangible computer-readable medium, such as a recordable data storage medium, which stores data representing a regular-expression dictionary, as opposed to an exact-match dictionary. The computerized system also includes a textual analysis component to analyze textual data by using at least the regular-expression dictionary. An article of manufacture of an embodiment of the invention includes a tangible computer-readable medium, and means in the medium. The means is for effecting or effectuating a regular-expression dictionary, as opposed to an exact-match dictionary, for utilization in computerized textual analysis.

Embodiments of the invention provide for advantages over the prior art. Whereas in the prior art only an exact-match dictionary can be employed within computerized textual analysis, within the invention a regular-expression dictionary can be employed in addition to or in lieu of an exact-match dictionary within such textual analysis. As a result, textual analysis is more accurate, more robust, and more effective, as compared to as in the prior art. Still other advantages, aspects, and embodiments of the invention will become apparent by reading the detailed description that follows, and by referring to the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

FIG. 1 is a flowchart of a method for constructing and using a regular-expression dictionary for use within computerized textual analysis, according to an embodiment of the invention.

FIGS. 2A, 2B, 2C, 2D, and 2E are diagrams of example entries that can populated a regular-expression dictionary for use within computerized textual analysis, according to varying embodiments of the invention.

DETAILED DESCRIPTION OF THE DRAWINGS

Figure 2A:
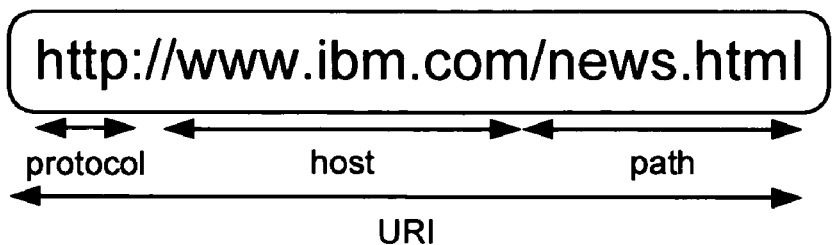

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

FIG. 1 shows a flowchart of a computer-implemented method 100, according to an embodiment of the invention. The method 100 is computer implemented in the sense that it is at least partially performed by a computer or other type of computing device. The method 100 is for constructing and using a regular-expression dictionary. It is noted that the regular-expression dictionary is described in relation to a particular term that is not necessarily a regular expression. This is for descriptive clarity, however, and those of ordinary skill within the art can appreciate that the process described is applicable to a regular-expression dictionary as well.

A regular-expression dictionary is different than an exact-match dictionary. That is, rather than exactly matching words and phrases within text, as in an exact-match dictionary, a regular-expression dictionary employs strings that describe or match a set of strings, according to certain syntax rules. For instance, a date may be referenced in a variety of different formats, such as January 1, 1970, 1 Jan. 1970, 1/1/1970, 1-1-70, and so on, and therefore resists exact matching as in an exact-match dictionary. Regular-expression dictionaries are thus employed where a regular expression exists, but which can be described in a variety of different notations. Such regular expressions include dates, currency amounts, telephone numbers, Internet universal resource identifiers (URI's) such as universal resource locators (URL's), and chemical symbols.

The method 100 defines data types for entries within the regular-expression dictionary to be constructed, within a markup-language schema (102). The markup language may be extensible Markup Language (XML), or another type of markup language. Data types may include the part of speech of a given regular expression, a definition of a given regular expression, a synonym or antonym of a given regular expression, and so on. The data types are defined in the markup-language schema in the sense that particular tags are employed to denote the data types. Examples of markup-language schema include XML schema.

For instance, the part of speech data type may be defined as follows in XML schema:

```
<element name="pos">
    <complexType>
        <attribute name="value" type="string"/>
    </complexType>
</element>
```

According to this schema definition, the part of speech data is described as follows in XML:

```
<pos value="value 1"/>
```

Similarly, the synonym data type is defined as follows:

```
<element name="syn">
    <complexType>
        <attribute name="value" type="string"/>
    </complexType>
</element>
```

The synonym data is thus described as <syn value="value 2"/>. In some cases, when data is equal to the word surface itself, the "value" attribute can be omitted. For instance, the data of date, January 1, 1970, is the data itself and therefore "value" attribute can be omitted. The date data type may be defined as follows in XML schema:

```
<element name="date">
    <complexType/>
</element>
```

According to this schema definition, the date data is described as <date/>.

Next, a structure within the markup-language schema is provided that encompasses the data types for the entries within the regular-expression dictionary (104).

The structure specifies how the data types are particularly ordered. For example, the structure may be as follows for a given entry:

```
<entry key = "word">
    <match>
        <pos value = "value 1"/>
        <syn value = "value 2"/>
    </match>
</entry>
```

In this example, the structure specifies that a given entry, for the word "word," is specified via an initial tag <entry key="word">, and ends with the tag </entry>. In between these two tags, one or more of the various data can be delineated as appropriate. The data are grouped by "match" tags or "submatch" tags. These tags indicate what the data correspond to. Tags "match" means that inner data correspond to the entire word. Tags "submatch" means that inner data correspond to the substring of the word. Thus in the example, the part of speech data type and the synonym data type have been delineated.

Once the data types and the structure have been defined and provided within the markup-language schema, entries can be added to the regular-expression dictionary using these data types and this structure (106). For each such entry, therefore, a mapping methodology is defined between a source definition of the entry to the structure and the data types within the markup-language schema (108). For example, for an example term such as "solution," the following source definition may be provided:

solution: noun; a way of solving a situation; syn answer.

The word following the term within the source definition may be mapped to the part of speech data type, the words between the two semicolons may be mapped to the definition data type, and the word after the term "syn" may be mapped to the synonym data type.

Thereafter, the specific definition for the entry in question can then be mapped to the data types within the structure of the markup-language schema, using the mapping methodology that has been defined (110). Thus, for the example of the previous paragraph, the source definition is mapped as follows:

```
<entry key = "solution">
    <match>
        <pos value = "noun"/>
        <definition value = "a way of solving a situation"/>
        <syn value = "answer"/>
    </match>
</entry key>
```

That is, the mapping methodology defined in part 108 of the method 100 denotes how the various portions of the source definition are to be mapped to the data types and the structure of the markup-language schema. By comparison, the mapping in part 110 actually maps the portions of the source definitions to the data types and the structure of the markup-language schema, based on this mapping methodology.

The entry, as has been mapped to the data types within the structure of the markup-language schema, can then be bound to a class of an object-oriented programming language (112). For example, the object-oriented programming language may be the Java® programming language. Binding the entry to a class within such an object-oriented programming language allows for the entry, as has been mapped to the data types within the structure of the markup-language schema, to be employed by textual analysis programs written in that programming language.

Once all the entries within the regular-expression dictionary have been processed in part 106 of the method 100, the class to which each entry has been bound can be compiled to construct a binary version of the regular-expression dictionary (114). Alternatively, however, compiling may not be performed, in which case the regular-expression dictionary is simply parsed or interpreted. Ultimately, computerized textual analysis is performed, such as by using the binary version of the regular-expression dictionary (116).

Computerized textual analysis can be performed using the regular-expression dictionary constructed in accordance with the method 100 of FIG. 1 for at least the following reasons. First, the various data types of the content of the regular-expression dictionary are defined, and a structure encompassing these data types is provided. For instance, as has been described, the data types and the structure are defined and provided within a markup-language schema, such as an XML schema. Second, binding the definitions of an object-oriented programming language class allows them to be accessed by computer programs written in such a programming language. Other aspects that render the regular-expression dictionary amenable to utilization for computerized textual analysis are described later in the detailed description.

FIGS. 2A, 2B, 2C, 2D, and 2E show examples of the types of regular expressions that can be defined and added to a regular-expression dictionary for textual analysis, using the method 100 of FIG. 1, according to varying embodiments of the invention. In FIG. 2A, the data types of the markup-language schema include <URI>, <protocol>, <host>, and <path>, where the structure of the markup-language schema corresponds to the universal resource identifier (URI) itself. A representative universal resource identifier, such as "http://www.ibm.com/news.html," can thus be defined as follows:

```
<entry key = "(http://)([^/]+)/?(.*)">
    <match>
        <URI/>
    </match>
    <submatch position="1">
        <protocol value="HTTP"/>
    </submatch>
    <submatch position="2">
        <host/>
    </submatch>
    <submatch position="3">
        <path/>
    </submatch>
</entry key>
```

Figure 2B:
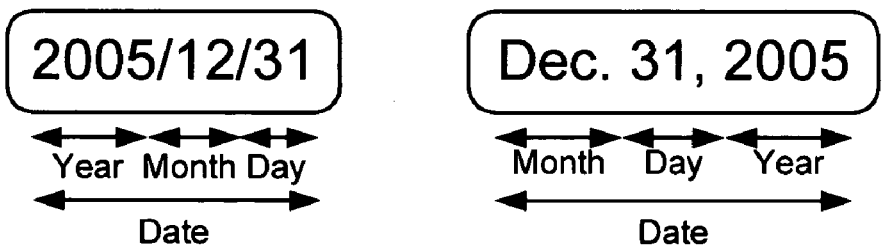

In FIG. 2B, the data types of the markup-language schema include <date>, <date year>, <date month>, <date day>, where the structure of the markup-language schema corresponds to the date itself. Representative date regular expressions such as 2005/12/31 and Dec. 31, 2005 can thus be defined as follows:

```
<entry key = "([0-9] [0-9] [0-9] [0-9])/ ([0-9] [0-9])/ ([0-9] [0-9])">
    <match>
        <date/>
    </match>
    <submatch position="1">
        <year/>
    </submatch>
    <submatch position="2">
        <month/>
    </submatch>
    <submatch position="3">
        <day/>
    </submatch>
</entry key>
<entry key = "Dec. 31, 2005">
    <date = "Dec. 31, 2005"/>
    <date year = "2005"/>
    <date month = "Dec"/>
    <date day = "31"/>
</entry key>
<entry key = "(Jan|Feb|Mar|Apr|May|Jun|Jul|Aug|Sep|Oct|Nov|Dec). ([0-9][0-9]), ([0-9] [0-9] [0-9] [0-9])">
    <match>
        <date/>
    </match>
    <submatch position="1">
        <month/>
    </submatch>
    <submatch position="2">
        <day/>
    </submatch>
    <submatch position="3">
        <year/>
```

-continued

```
    </submatch>
</entry key>
```

Figure 2C:
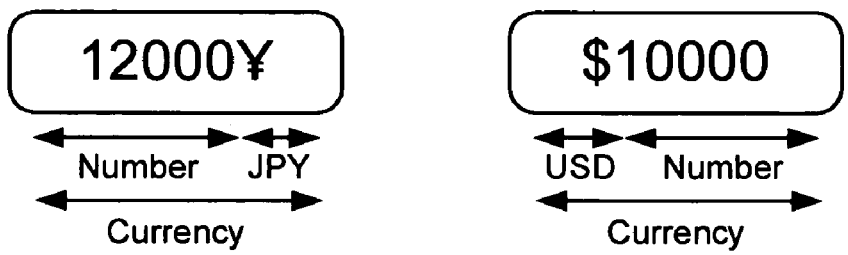

In FIG. 2C, the data types of the markup-language schema include <currency>, <currency type>, and <currency value>, where the structure of the markup-language schema corresponds to the currency itself. Representative currency regular expressions such as 12000 ¥ and $10000 can thus be defined as follows:

```
<entry key = "([0-9]+)(¥)">
    <match>
        <currency/>
    </match>
    <submatch position="1">
        <currency_value/>
    </submatch>
    <submatch position="2">
        <currency_type value="JPY"/>
    </submatch>
</entry key>
<entry key = "($)([0-9]+)">
    <match>
        <currency/>
    </match>
    <submatch position="1">
        <currency_type value= "USD"/>
    </submatch>
    <submatch position="2">
        <currency_value/>
    </submatch>
</entry key>
```

In FIG. 2D, the data types of the markup-language schema include <organic compound>, <fatty acid>, <carbons>, <double bonds>, where the structure of the markup-language schema corresponds to the organic compound itself. Representative regular expressions for organic compound names such as docosahexaenoic acid and eicosapentaenoic acid can thus be defined as follows:

```
<entry key = "(docosa|eicosa)(hexaen|pentasaen)(oic acid)">
    <match>
        <organic_compound/>
    </match>
    <submatch position= "1">
        <carbons/>
    </submatch>
    <submatch position= "2">
        <double_bonds/>
    </submatch>
    <submatch position= "3">
        <fatty_acid/>
    </submatch>
</entry key>
```

Finally in FIG. 2E, the data types of the markup-language schema include <product>, <vendor>, <brand>, <product name>, <series>, <product number>, and <edition>, where the structure of the markup-language schema corresponds to the product itself. Representative regular expressions for product name references such as "IBM eServer zSeries 990", "IBM zSeries 990", and "zSeries 990" can thus be defined as follows:

```
<entry key = "(IBM)+ (eServer)+ (zSeries)+ (990)+">
    <match>
        <product value="IBM eServer zSeries 990"/>
    </match>
    <submatch position="1">
        <vendor/>
    </submatch>
    <submatch position="2">
        <brand/>
    </submatch>
    <submatch position="3">
        <series/>
    </submatch>
    <submatch position="4">
        <product_number/>
    </submatch>
</entry key>
```

Another representative regular expressions for product name references such as "Lotus Domino Enterprise Server" and "Lotus Domino" can thus be defined as follows:

```
<entry key = "(Lotus)+ (Domino)+ (Enterprise Server)+">
    <match>
        <product value="Lotus Domino Enterprise Server"/>
    </match>
    <submatch position="1">
        <brand/>
    </submatch>
    <submatch position="2">
        <product_name/>
    </submatch>
    <submatch position="3">
        <edition/>
    </submatch>
</entry key>
```

The regular-expression dictionary constructed in accordance with the method 100 of FIG. 1, examples of entries of which have been described in relation to FIGS. 2A, 2B, 2C, 2D, and 2E, can be employed within textual analysis. Where a regular expression is found within text that corresponds to one of the entries themselves, the various data types can be employed to provide meaning to the entry found within the text. For instance, with respect to the text "Lotus Domino Enterprise Server," it can be determined that the brand is "Lotus," the product name is "Domino," and so on. Where the parts of text are being analyzed, a regular-expression dictionary annotates each of them by the data provided by "submatch" tags, such as has been described in the above XML examples. For instance, the text may be "Domino Enterprise Server", and the various parts "Domino" and "Enterprise Server" are provided meanings by the regular-expression dictionary.

Figure 3:
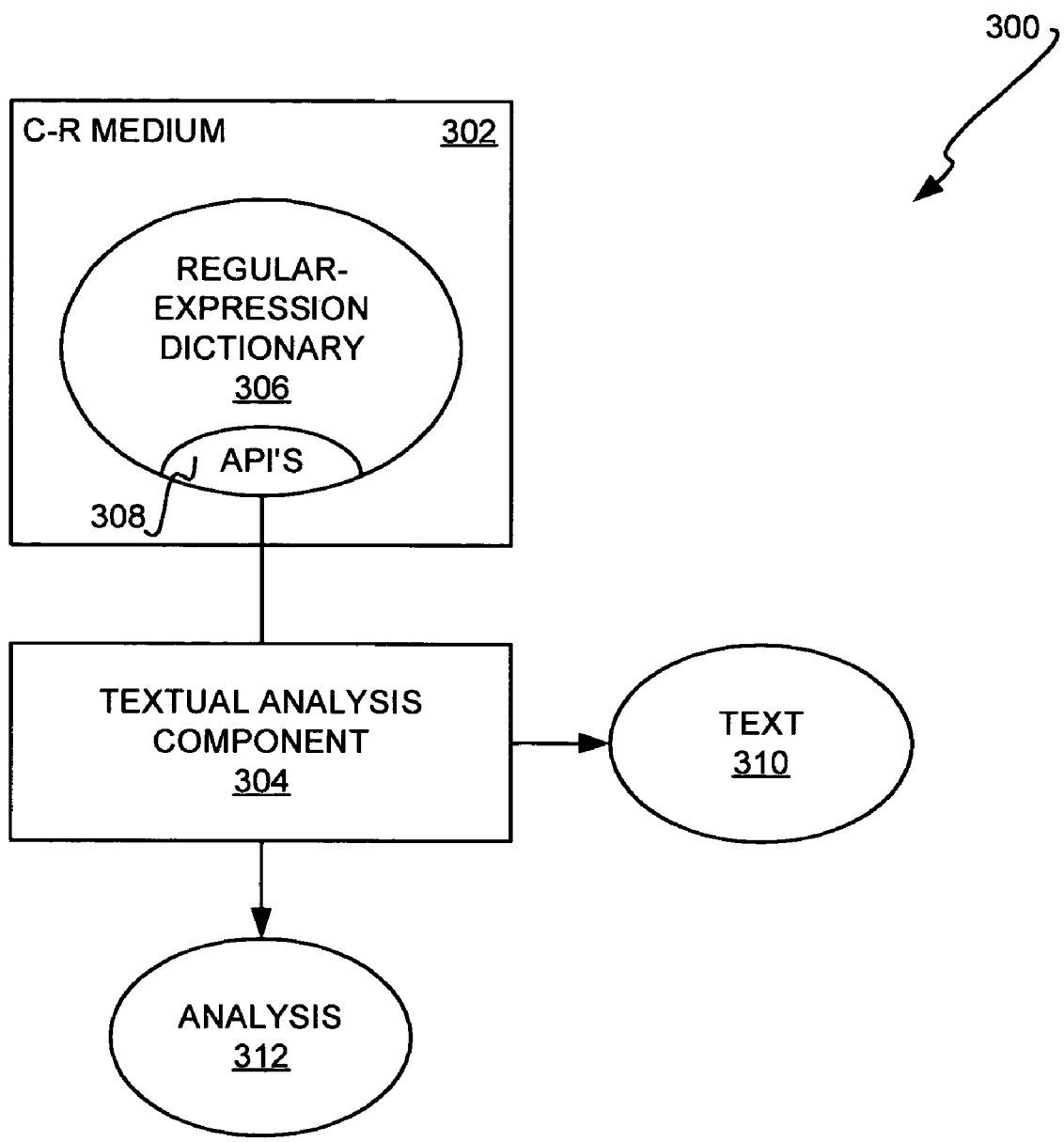
FIG. 3 is a diagram of a system including a regular-expression dictionary and a textual analysis component that employs this regular-expression dictionary, according to an embodiment of the invention.

FIG. 3 shows a computerized system 300, according to an embodiment of the invention. The computerized system 300 may be implemented as one or more computing devices, as can be appreciated by those of ordinary skill within the art. Whereas the system 300 is depicted in FIG. 3 as including a computer-readable medium 302 storing a regular-expression dictionary 306, and a textual analysis component 304, the system 300 will typically include other components and parts, in addition to those depicted in FIG. 3.

The computer-readable medium 302 is a tangible medium, such as a recordable data storage medium like a hard disk drive, a semiconductor memory, and so on. The regular-expression dictionary 306 is as opposed to an exact-match dictionary, as has been described, and exposes a number of application programming interfaces (API's) 308 for access by the textual analysis component 304. The API's 308, for instance, allow the component 304 to match strings within textual data 310 to the regular-expression dictionary 306 to receive definitions and other information regarding these strings. The API's 308 may further provide for adding and deleting entries within the regular-expression dictionary 306.

The API's 308, along with other aspects of the regular-expression dictionary 306, such as the ability to be managed as a resource, such as loading and unloading thereof, due to the dictionary 306 having had its definitions bound to an object-oriented programming language class and/or having been compiled-into a binary version thereof, are capabilities allowing the dictionary 306 to be used for textual analysis. That is, these capabilities, along with the others that have been mentioned, enable the regular-expression dictionary 306 of embodiments of the invention to be employed for textual analysis, such as by the textual analysis component 304. This is advantageous, as in the prior art, regular-expression dictionaries cannot be employed for textual analysis.

The textual-analysis component 304 may be implemented in software, hardware, or a combination of software and hardware. The component 304 analyzes the textual data 310 by using at least the regular-expression dictionary 306, and outputs this analysis 312 for review by a user, for instance. The component 304 may further use other dictionaries, such as an exact-match dictionary as in the prior art, but such additional dictionaries are not depicted in FIG. 3 for illustrative convenience.

It is noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. Therefore, it is manifestly intended that this invention be limited only by the claims and equivalents thereof.

I claim:

1. In a computerized system including one or more computing devices, a method for constructing a regular-expression dictionary, as opposed to an exact-match dictionary, for utilization in computerized textual analysis, the method comprising:

defining, using at least one of the computing devices, one or more data types for entries within the regular-expression dictionary in a markup-language schema;

providing, using at least one of the computing devices, a structure in the markup-language schema encompassing the data types of the entries within the regular-expression dictionary;

for each entry of a plurality of the entries,
defining, using at least one of the computing devices, a mapping methodology between a source definition of the entry to the structure and the data types within the markup-language schema; and,
mapping, using at least one of the computing devices, a definition of the entry to the data types within the structure of the markup-language schema using the mapping methodology.

2. The method of claim 1, further comprising, for each entry, binding the entry, the definition of which has been mapped to the data types within the structure of the markup-language schema, to a class of an object-oriented programming language.

3. The method of claim 2, further comprising compiling the class to which each entry has been bound to construct a binary version of the regular-expression dictionary.

4. The method of claim 2, wherein the object-oriented programming language is the Java programming language.

5. The method of claim 1, wherein the structure corresponds to a uniform resource identifier (URI), and the data types correspond to the URI, a protocol of the URI, a host of the URI, and a path of the URI.

6. The method of claim 1, wherein the structure corresponds to a date, and the data types correspond to the date, a year of the date, a month of the date, and a day of the date.

7. The method of claim 1, wherein the structure corresponds to a currency, and the data types correspond to the currency, a currency type of the currency, and a currency value of the currency.

8. The method of claim 1, wherein the structure corresponds to an organic compound, and the data types correspond to at least one or more of the organic compound, a fatty acid of the organic compound, a number of carbons of the organic compound, and a number of double bonds of the organic compound.

9. The method of claim 1, wherein the structure corresponds to a product, and the data types correspond to at least one or more of the product, a vendor of the product, a brand of the product, a product name of the product, a series of the product, a product number of the product, and an edition of the product.

10. The method of claim 1, wherein the markup-language is the eXtensible Markup Language (XML).

11. A computer readable storage medium having computer readable program code embodied therewith for constructing a regular-expression dictionary, as opposed to an exact-match dictionary, for utilization in computerized textual analysis, the computer readable storage medium comprising:

computer readable program code configured to define one or more data types for entries within the regular-expression dictionary in a markup-language schema;

computer readable program code configured to provide a structure in the markup-language schema encompassing the data types of the entries within the regular-expression dictionary;

computer readable program code configured to for each entry of a plurality of the entries,
define a mapping methodology between a source definition of the entry to the structure and the data types within the markup-language schema; and,
map a definition of the entry to the data types within the structure of the markup-language schema using the mapping methodology.

12. The computer readable storage medium of claim 11, further comprising computer readable program code configured to, for each entry, binding the entry, the definition of which has been mapped to the data types within the structure of the markup-language schema, to a class of an object-oriented programming language.

13. The computer readable storage medium of claim 12, further comprising computer readable program code configured to compile the class to which each entry has been bound to construct a binary version of the regular-expression dictionary.

14. The computer readable storage medium of claim 12, wherein the object-oriented programming language is the Java programming language.

15. The computer readable storage medium of claim 11, wherein the structure corresponds to a uniform resource identifier (URI), and the data types correspond to the URI, a protocol of the URI, a host of the URI, and a path of the URI.

16. The computer readable storage medium of claim 11, wherein the structure corresponds to a date, and the data types correspond to the date, a year of the date, a month of the date, and a day of the date.

17. The computer readable storage medium of claim 11, wherein the structure corresponds to a currency, and the data types correspond to the currency, a currency type of the currency, and a currency value of the currency.

18. The computer readable storage medium of claim 11, wherein the structure corresponds to an organic compound, and the data types correspond to at least one or more of the organic compound, a fatty acid of the organic compound, a number of carbons of the organic compound, and a number of double bonds of the organic compound.

19. The computer readable storage medium of claim 11, wherein the structure corresponds to a product, and the data types correspond to at least one or more of the product, a vendor of the product, a brand of the product, a product name of the product, a series of the product, a product number of the product, and an edition of the product.

20. The computer readable storage medium of claim 11, wherein the markup-language is the eXtensible Markup Language (XML).

* * * * *